June 22, 1971     B. S. HARRINGTON, JR     3,585,724
AUTOMATIC UNSHACKLER AND TRANSFER SYSTEM
Filed April 14, 1969     2 Sheets-Sheet 1
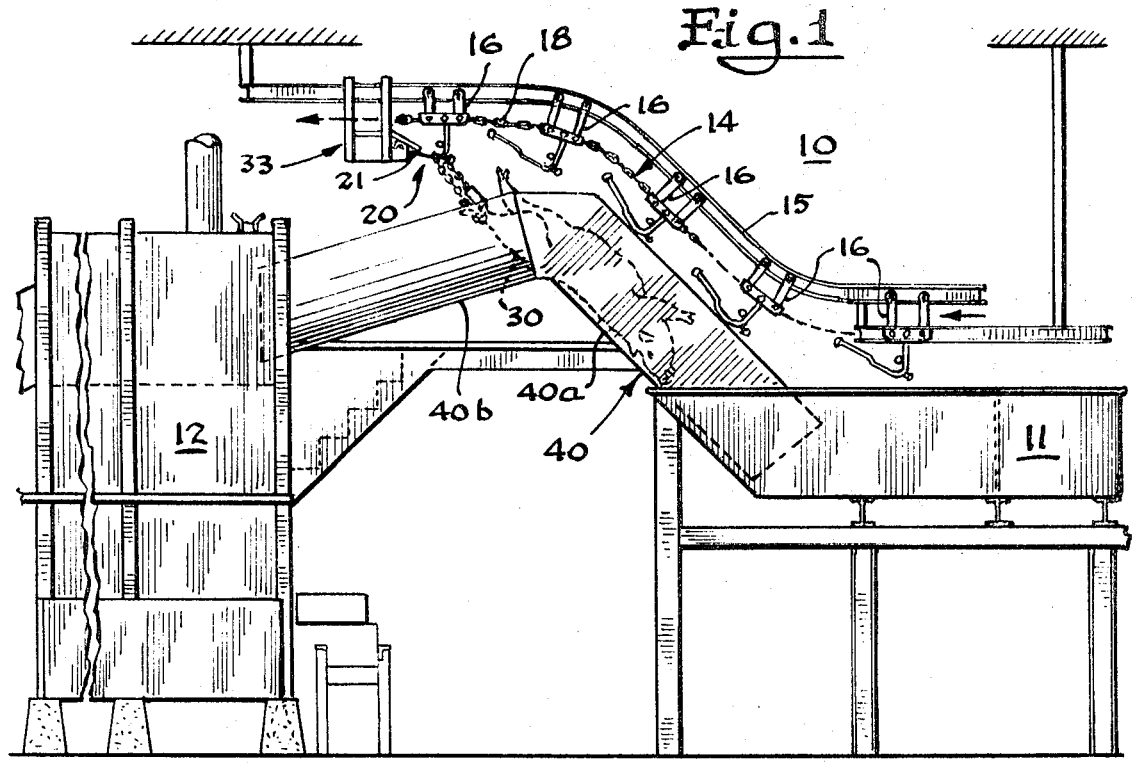
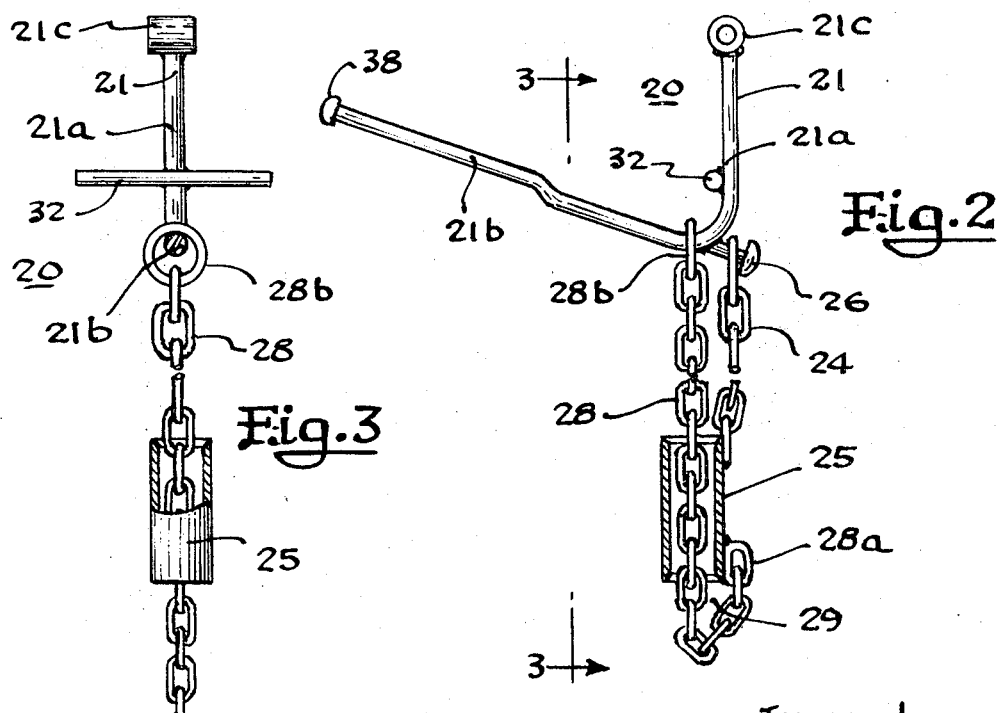
Inventor
Bert S. Harrington, Jr.
By Mason, Kolehmainen, Rathburn & Wyss
Attorneys June 22, 1971 B. S. HARRINGTON, JR 3,585,724
AUTOMATIC UNSHACKLER AND TRANSFER SYSTEM
Filed April 14, 1969 2 Sheets-Sheet 2

Inventor
Bert S. Harrington, Jr.
By Mason, Kolehmainen, Rathburn & Wyss
Attorneys United States Patent Office 3,585,724
Patented June 22, 1971

3,585,724
AUTOMATIC UNSHACKLER AND TRANSFER
SYSTEM
Bert S. Harrington, Jr., Chamblee, Ga., assignor to
Chemetron Corporation, Chicago, Ill.
Filed Apr. 14, 1969, Ser. No. 816,009
Int. Cl. A22b 5/00, 7/00
U.S. Cl. 17—24                                      12 Claims

ABSTRACT OF THE DISCLOSURE

There is provided a self-securing shackle and automatic unshackler and transfer system for transferring carcasses in a slaughterhouse, aligning the carcasses with a desired orientation, and releasing the carcasses at the desired position. The shackle is of the sleeve and chain type wherein moving of a shackle bar past a cam pivots the shackler bar to release the sleeve and chain. Pivoting of the bar will loosen a loop formed by the chain and sleeve and release a carcass. The carcass will drop at a desired point and with a desired orientation.

---

The present invention relates to a self-securing shackle and automatic unshackler and transfer system, and more particularly, to a self-securing shackle and automatic unshackler and transfer system for use in transferring and releasing carcasses in a slaughterhouse. Specifically the unshackler is herein described with reference to the slaughtering of hogs, but may be used for other carcasses as well.

Carcasses in a slaughterhouse are commonly moved by clamping or locking of a shackle connected to a conveyor trolley to one of the hind legs of the carcass, the trolley moving along a track or other suitable overhead conveyor. Prior commercial practice has required an operator to unshackle or open the shackle holding the carcass when it is desired to drop or release the carcass. More recently commercial installations have been employed wherein the shackle is released by suitable mechanical means, such as with pneumatic or hydraulic cylinders and the like.

Moreover it is frequently desirable upon release of a carcass that the carcass has a particular orientation with regard to further processing apparatus. One such location wherein a particular orientation is desired is where a hog carcass is released to pass into the dehairing apparatus after being removed from a scalding tub or bath. The position of the legs and carcass at the infeed point to the dehairer is important to insure minimum damage of the carcass. Thus it is desirable for the carcass to feed into the dehairer tail first. Heretofore such orientation has been possible with the use of infeed conveyors or rollers to turn or orient the carcass. However such an infeed conveyor adds to the cost of the installation and, moreover, complicated unsackling apparatus and infeed conveyors increase the maintenaance cost and breakdown time.

Accordingly it is an object of the present invention to provide a new and improved automatic unshackler and transfer system which overcomes the above mentioned difficulties.

Another object of the present invention is the provision of a new and improved self-securing shackle for slaughterhouse carcasses and the like.

Yet another object of the present invention is to provide a new and improved automatic unshackler for slaughterhouse carcasses and the like.

Yet another object of the present invention is to provide an improved automatic unshackler.

A further object of the present invention is to provide a new and improved automatic unshackling and transferring system.

Yet a further object of the present invention is to provide a new and improved system for orienting slaughterhouse carcasses and the like as they are fed into the dehairing apparatus of the slaughterhouse.

Further objects and advantages of the present invention will become apparent as the following description proceeds and the features of novelty which characterize the invention will be pointed out with particularity in the claims annexed to and forming a part of this specification.

In accordance with these and other objects, there is provided an improved self-securing shackle and automatic unshackler and transfer system for use in a slaughterhouse. The automatic unshackler includes a self-securing shackle for use on a conveyor or the like in the slaughterhouse adapted to move with a trolley along the conveyor path. The shackle includes a shackle bar formed in a generally acute angle defining connecting legs, one end of which is pivotally connected to the trolley means. The shackle is of the sleeve and chain type, wherein a clamping sleeve is connected to the shackle bar near the connecting point of the legs, and flexible means are provided connecting one end of the sleeve and normally looped below the sleeve, extending through the sleeve and having its other end slideably positioned on the shackle bar. Pivoting of the shackle bar moves the flexible means or chains of the shackle relative to each other to loosen the shackle loop.

The lower extending flexible connecting member forms a generally noose-like loop below the sleeve, so that with the shackle bar hanging in a shackle position, the loop is drawn tightly around a part of a carcass, such as around a hind leg of a hog carcass. Loosening of the chains relative to each other loosens the loop and permits dropping of the carcass.

The present invention also relates to an automatic transfer and aligning system wherein the improved shackler is provided with a cam follower, and a cam is provided along the conveyor path engaged by the cam follower to pivot the shackle bar at the desired point to release a carcass.

In accordance with yet another feature of the present invention the carcass will be aligned with the hind legs moving forwardly by providing a carcass slide having an upwardly inclined run over which the carcass is dragged followed by a downwardly inclined run. The carcass may be automatically released as it begins its travel down the downwardly inclined run so as to provide the proper orientation of the carcass. Advantageously an arrangement according to the present invention which feeds into the dehairing apparatus in the slaughterhouse provides for the optimum orientation of the carcass.

It will be seen that in accordance with the present invention all of the carcasses will be fed into the dehairing apparatus or other processing device tail first, without the use of infeed rollers. The position of the legs of the hog at this point is important for minimizing damage of the carcass. Moreover according to the present invention the position of the carcass can be controlled positively for most advantageous position, with the legs of the carcass up.

Advantageously the present invention by eliminating the infeed conveyor reduces plant and manufacturing costs, and reduces maintenance cost and breakdown time. The automatic release is obtained without the use of outside power sources such as air, hydraulic or electric source to actuate the unshackler. Carcasses such as those of hogs may be dropped from the shackle without lifting the carcasses entirely out of a scalding tub or the like; moreover the hog carcass may be dropped with or without the entire weight of the hog on the shackle, and with the hog at an angle as in a dragging action where the shackle chain may be at an angle from vertical. Thus the upward incline of the slide run may be at an angle of up to 45 degrees or more as required by the installation. Chain or cable wear does not affect the operation of the unshackling unit. Moreover the headroom between the conveyor and the slaughterhouse apparatus is minimized. Great flexibility in regard to the infeed direction of the carcass is obtained by raising the conveyor or delaying the release point of the carcass on the slide.

For a better understanding of the present invention, reference may be had to the accompanying drawings wherein:

FIG. 1 is an elevational view of a portion of a slaughterhouse processing arrangement wherein a carcass is conveyed from a scalding tub into a dehairing machine;

FIG. 2 is a front elevational view of a self-securing shackle according to the present invention;

FIG. 3 is an end view of the shackle of FIG. 2;

Figure 4:
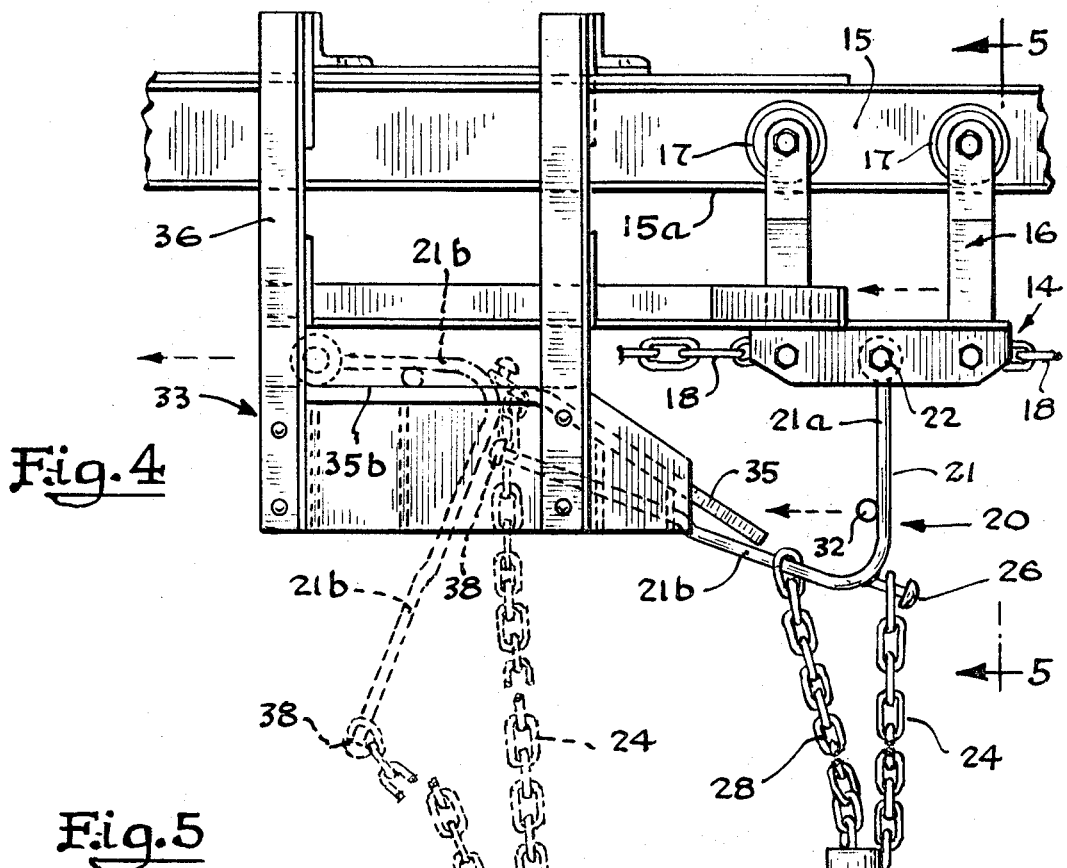
FIG. 4 is a fragmentary elevational view of the slaughterhouse system of FIG. 1, illustrating the conveyor trolley and shackle to a larger scale.

Referring now to the drawings, and particularly to FIG. 1 thereof, there is illustrated an automatic transfer and aligning system 10 between a scalding tube 11 and a dehairer 12 of a slaughterhouse. The automatic transfer and aligning system 10 includes an overhead conveyor track 15, of generally I-shape cross section, FIG. 5, which carries an endless moving conveyor assembly 14 including a series of conveyor trolleys 16. The trolleys 16 are each provided with suitable rollers 17, FIGS. 4 and 5, riding on a lower flange 15a of the conveyor 15. The adjacent trolleys 16 are connected by suitable chain 18 and the conveyor assembly 14 is driven along the track 15 in any suitable manner.

In accordance with the present invention, each of the trolleys 16 carries a shackle assembly 20 including a shackle bar 21 formed in a generally acute angle defining a normally vertical leg 21a and a normally upwardly and forwardly inclined leg 21b. The upper end of the vertical leg 21a is pivotally connected to its respective trolley 16 as by a bolt 22 passing through a hinge boss 21c formed on the shackle bar 21. The shackle assembly 20 is of the sleeve and chain type, having a first run of chain 24 connecting the upper end of a sleeve 25 to the shackle bar 21 adjacent the connection of the legs 21a and 21b. Specifically the uppermost one of the chain links from the run 24 is secured over a projected headed pin 26 extending from the shackle bar 21. A second run of chain 28 has one end 28a thereof secured to the lower end of the sleeve 25, and normally is looped below the sleeve 25, extending through the sleeve 25 and having its other end 28b slideably positioned on the upwardly and forwardly inclined leg 21b of the shackle bar 21. To this end the uppermost end 28b of the chain length 28 is formed as a ring, as best illustrated in FIGS. 3 and 5, to readily slide on the bar 21. In its normal position, the shackle assembly 20 defines a noose-like loop 29 which may be clamped or locked around a part of a carcass, such as the hind leg of a hog 30, FIGS. 1 and 4. The shackle will automatically draw the noose-like loop tightly around the hog extremity, so as to secure a hog during normal transfer operation.

To provide for the release or unshackling of a carcass, the shackle assembly 20 includes suitable trip means cooperable with a tripping cam. More specifically there is provided a cam follower 32 in the form of a transverse rod secured to the shackle bar 21 remote from the pivot boss 21c thereof. Additionally there is provided an unshackling cam assembly 33 including spaced cam plates 34 each provided with a cam surface or track 35. Each cam surface 35 has an upwardly and forwardly inclined portion 35a blending into a generally horizontal portion 35b. The cam assembly 33 is mounted below the track 15 on a suitable frame 36 at a height to intercept the forward travel of the cam follower 32 so as to trip the cam and release a carcass at the desired location.

From the above description, the operation of the automatic unshackling device is believed clear. However, briefly, it will be understood that a carcass, such as a hog carcass 30, is secured within the noose-like loop 29 of a shackle assembly 20, and is conveyed along the track 15 by the advance of the trolley 16. At a desired location along the track, there is positioned the unshackling cam assembly 33. The forward travel or advance of the trolley 16, in the direction indicated by the arrow in FIGS. 1 and 4, will cause the cam follower 32 on the shackle bar 21 to engage the cam surface 35. Further advance of the trolley 16 will cause the cam follower 32 to ride up the upwardly and forwardly inclined cam surface 35a, pivoting the shackle bar 21 from the position indicated in solid in FIG. 4 to the position indicated in phantom therein. Pivoting of the shackle bar will raise the chain run 24 and will lower the end of chain 28. The relative movement of these two chains provides for the loosening of the noose-like loop 29, as indicated in phantom. If desired the length of chain 28 may be permitted to slide free from the leg 21b of the shackle bar 21; however in the illustrated embodiment there is provided a stop 38 to retain the end of the chain 28.

Figure 5:
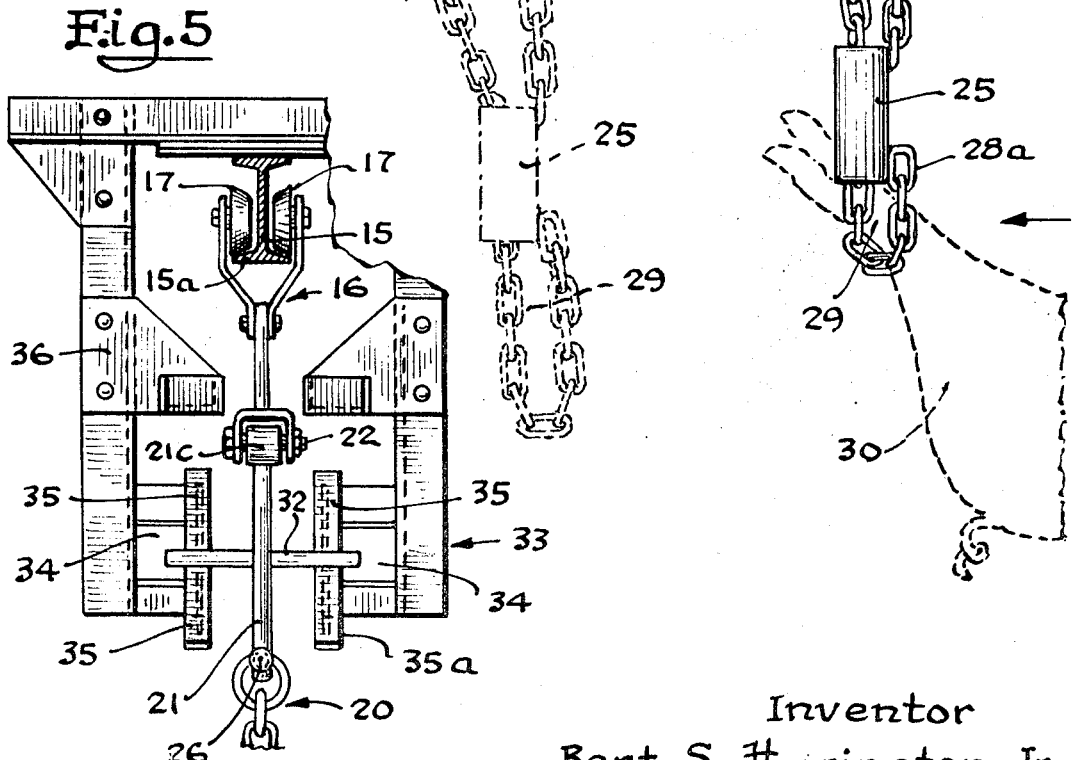
FIG. 5 is a cross sectional view of the detail of FIG. 4, taken along line 5—5 of FIG. 4.

When a trolley again reaches a pickup position, an operator needs merely to pull the noose-like loop 29, now open, around one of the hind legs of a hog carcass 30, and pivot the shackle bar 21 clockwise as viewed in FIGS. 2 and 4 so that the end of chain 28 slides back along the leg 21b to a position adjacent the connection of the legs 21a and 21b.

To provide orientation of the hog in a desired position, and particularly with the hind legs forward and the legs up, there is provided a slide or chute 40, FIG. 1, of generally trough-shape cross section and having an upwardly inclined run 40a followed by a downwardly inclined run 40b. The upwardly inclined run 40a has its lower end extending into the scalding tub, while the downwardly inclined run 40b discharges into the dehairing machine 12. Thus a hog carcass 30 is dragged from the scalding tub 11 up the slide 40a properly oriented with the hind legs forward and the legs up. When the shackle assembly 20 passes the unshackling cam assembly 33, the hog carcass 30 will be released. The carcass 30 will slide down the downwardly inclined run 40b and enter the dehairing machine 12 with the proper position. It is particularly important that the hog carcasses 30 be properly oriented as they enter the dehairing machine so as to minimize damage of the carcass. Advantageously the automatic unshackling and transfer system according to the present invention eliminates the need for an operator between the scalding tub and dehairer to release the hog carcass from the overhead conveyor, and to orient the carcass in the desired position. Moreover the release and orientation of the carcass is done in an inexpensive and simple manner so that power systems such as pneumatic or hydraulic releases, and infeed roller arrangements to the dehairer are eliminated.

Although the present invention has been described by reference to only a single embodiment thereof, it will be apparent that numerous modifications and embodiments may be devised by those skilled in the art, and it is intended by the appended claims to cover all modifications and embodiments which will fall within the true spirit and scope of the present invention.

What is claimed as new and desired to be secured by Letters Patent of the United States is:

1. A self-securing shackle for use on a conveyor in a slaughterhouse and the like comprising:
   trolley means adapted to move along a conveyor path;
   a shackle bear formed in a generally acute angle defining connecting legs and having one end pivotally connected to said trolley means;
a clamping sleeve;
connecting means connecting said sleeve with said shackle bar near the connecting point of said legs;
flexible connecting means having one end connected to said sleeve and normally looped below said sleeve, said flexible means extending through said sleeve and having its other end slideably positioned on said shackle bar; and
cam follower means connected to said shackle bar for pivoting said shackle bar to move said connecting means relative to each other.

2. A self-securing shackle for use on a conveyor in a slaughterhouse and the like comprising:
trolley means adapted to move along a conveyor path;
a shackle bar formed in a generally acute angle defining a normally vertical leg and a normally upwardly and forwardly inclined leg extending therefrom;
pivotal means connecting said vertical leg to said trolley means;
a clamping sleeve;
first flexible means connecting said sleeve with said shackle bar near the lower end of said vertical leg;
second flexible means having one end connected to said sleeve and normally looped below said sleeve, said second flexible means extending through said sleeve and having its other end slideably positioned on said upwardly and forwardly inclined leg; and
cam follower means connected to said shackle bar for pivoting said shackle bar rearwardly to move said flexible means relative to each other.

3. A self-securing shackle as set forth in claim 2 wherein said first and second flexible means comprise lengths of chain.

4. A self-securing shackle as set forth in claim 2 wherein said upwardly and forwardly inclined leg includes stop means for preventing disengagement of said second flexible means from said shackle bar upon pivoting of said shackle bar rearwardly.

5. A self-securing shackle as set forth in claim 2 wherein said cam follower means is adapted to move said shackle bar to raise said first flexible means and to lower said second flexible means relative to each other.

6. A self-securing shackle for use on a conveyor in a slaughterhouse and the like comprising:
trolley means adapted to move along a conveyor path;
a shackle bar formed in a generally acute angle defining connecting legs and having one end pivotally connected to said trolley means;
a clamping sleeve;
first flexible means connecting said sleeve with said shackle bar near the connecting point of said legs; and
second flexible means having one end connected to said sleeve and normally looped below said sleeve, said second flexible means extending through said sleeve and having its other end slideably positioned on said shackle bar.

7. An automatic unshackler for use in a slaughterhouse and the like comprising:
a conveyor track;
trolley means adapted to move along said conveyor track;
a shackle bar formed in a generally acute angle defining a normally vertical leg and a normally upwardly and forwardly inclined leg extending therefrom;
pivotal means connecting said vertical leg to said trolley means;
a clamping sleeve;
first flexible means connecting said sleeve with said shackle bar near the lower end of said vertical leg;
second flexible means having one end connected to said sleeve and normally looped below said sleeve, said second flexible means extending through said sleeve and having its other end slideably positioned on said upwardly and forwardly inclined leg;
cam follower means connected to said shackle bar for pivoting said shackle bar; and
cam means positioned along said track to trip said cam follower.

8. An automatic unshackler as set forth in claim 7 wherein said cam means includes a cam surface inclined upwardly and forwardly in the path of said cam follower means so that said shackle bar pivots rearwardly relative to said trolley means lifting said first flexible means and permitting said other end of said second flexible means to slide down said normally upwardly and forwardly inclined leg.

9. An automatic unshackler as set forth in claim 8 wherein said inclined leg includes a free outer end provided with stop means adjacent said free end for retaining said other end of said second flexible means.

10. An automatic transfer and aligning system for slaughterhouse carcasses and the like comprising:
a carcass slide having an upwardly inclined run followed by a downwardly inclined run;
an overhead conveyor over said slide;
trolley means adapted to move along said conveyor and to pull a carcass up said upwardly inclined run;
a shackle bar formed in a generally acute angle defining a normally vertical leg and a normally upwardly and forwardly inclined leg extending therefrom;
pivotal means connecting said vertical leg to said trolley means;
a clamping sleeve;
first flexible means connecting said sleeve with said shackle bar near the lower end of said vertical leg;
second flexible means having one end connected to said sleeve and normally looped below said sleeve, said second flexible means extending through said sleeve and having its other end slideably positioned on said upwardly and forwardly inclined leg whereby the second flexible means and clamping sleeve will lock around the leg of a carcass under the weight thereof;
cam follower means connected to said shackle bar for pivoting said shackle bar; and
cam means including a cam surface inclined upwardly and forwardly in the path of said cam follower means for pivoting said shackle bar at a point whereby the carcass will slide down said downwardly inclined run with a desired orientation of the carcass.

11. An automatic transfer and aligning system for slaughterhouse carcasses and the like, said system comprising:
a carcass slide having an upwardly inclined run followed by a downwardly inclined run;
an overhead conveyor over said slide;
trolley means adapted to move along said conveyor and to pull a carcass up said upwardly inclined run;
a shackler adapted to lock by the weight of a carcass around a leg of the carcass; and
automatic unshackling means associated with said overhead conveyor and said unshackler for releasing a carcass therefrom at a point whereby the carcass will slide down said downwardly inclined run with a desired orientation, said unshackling means including cam means and cam follower means relatively movable upon movement of said trolley means along said conveyor for pivoting said shackler from a carcass holding position to a release position upon passage of said trolley means over said slide.

12. An automatic transfer and aligning system for feeding slaughterhouse carcasses with a desired orientation into a dehairing apparatus, said system including:
a carcass slide having an upwardly inclined run followed by a downwardly inclined run feeding into a dehairing apparatus;

an overhead conveyor over said slide;

trolley means adapted to move along said conveyor and to pull a carcass up said upwardly inclined run;

a shackler adapted to lock by the weight of a carcass around a leg of the carcass; and automatic unshackling means associated with said overhead conveyor and said unshackler for releasing a carcass therefrom at a point whereby the carcass with a desired orientation will slide down said downwardly inclined run into a dehairing apparatus, said unshackling means including cam means and cam follower means relatively movable upon movement of said trolley means along said conveyor for pivoting said shackler from a carcass holding position to a release position upon passage of said trolley means over said slide.

References Cited
UNITED STATES PATENTS

| | | | |
|---|---|---|---|
| 976,316 | 11/1910 | Thomson | 17—24UX |
| 1,672,555 | 6/1928 | Barker et al. | 17—11.2 |
| 3,111,706 | 11/1963 | Kopp | 17—24 |

LUCIE H. LAUDENSLAGER, Primary Examiner